United States Patent
Vemula et al.

(10) Patent No.: US 10,003,521 B2
(45) Date of Patent: Jun. 19, 2018

(54) FIBRE CHANNEL N_PORT VIRTUALIZATION GATEWAY WITH SHORTCUT PATH LOGIC

(71) Applicant: Lenovo Enterprise Solutions (Singapore) PTE. LTD., New Tech Park (SG)

(72) Inventors: Hari Hara Kiran Prasad Vemula, Bangalore (IN); Praveen Mada, Bangalore (IN); Vinod Kashyap, Bangalore (IN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 105 days.

(21) Appl. No.: 15/141,287

(22) Filed: Apr. 28, 2016

(65) Prior Publication Data

US 2017/0317918 A1    Nov. 2, 2017

(51) Int. Cl.
| H04L 12/28 | (2006.01) |
| H04L 12/721 | (2013.01) |
| H04L 12/933 | (2013.01) |
| H04L 12/66 | (2006.01) |

(52) U.S. Cl.
CPC .............. *H04L 45/12* (2013.01); *H04L 12/66* (2013.01); *H04L 49/15* (2013.01)

(58) Field of Classification Search
CPC .......... H04L 45/12; H04L 49/15; H04L 12/66
See application file for complete search history.

(56) References Cited

U.S. PATENT DOCUMENTS

| 9,755,853 | B2* | 9/2017 | Berman | .............. H04L 12/4604 |
| 2009/0116507 | A1* | 5/2009 | Kanda | .................... H04L 47/10 370/464 |
| 2013/0028135 | A1* | 1/2013 | Berman | .............. H04L 12/4625 370/254 |
| 2017/0012903 | A1* | 1/2017 | Matzek | ............... G06F 9/45558 |

OTHER PUBLICATIONS

Cisco White Paper, "N-Port Virtualization in the Data Center", Sep. 15, 2008, 7 pp.

(Continued)

*Primary Examiner* — Robert Wilson
(74) *Attorney, Agent, or Firm* — Jason Friday (57) ABSTRACT

A Fibre Channel (FC) N_Port virtualization (NPV) gateway apparatus includes an NP_Port to connect to an F_Port of an FC switch of an FC fabric, a first F_Port to connect to a host device, and a second F_Port to connect to a target device. The apparatus includes shortcut path logic to create a shortcut path between the host and target devices to permit the host and target devices to communicate with one another without the communication traversing the switch. In response to receiving communication from the host device addressed to the target device, the apparatus diverts the communication to the target device over the shortcut path in lieu of sending it to the switch. In response to receiving communication from the target device addressed to the host device, the apparatus diverts the communication to the host device over the shortcut path in lieu of sending it to the switch.

13 Claims, 8 Drawing Sheets

(56) References Cited

OTHER PUBLICATIONS

Lowe, Scott, "Understanding NPIV and NPV", Scott's Weblog, online <http://blog.scottlowe.org/2009/11/27/understanding-npiv-and-npv/>, Nov. 27, 2009, 6 pp.
"NPG (NPIV Proxy Gateway) Mode Vs Full Fabric Mode in FCoE", Internet Protocols—Tech Blog—Its all about Networks!, online <https://ippoint.wordpress.com/2015/03/07/npg-npiv-proxy-gateway-mode-vs-full-fabric-mode-in-fcoe/>, Mar. 7, 2015, 2 pp.
"NPV and NPIV", The Data Center Overlords, online <https://datacenteroverlords.com/2012/05/08/npv-and-npiv/>, May 8, 2012, 19 pp.
"N-Port Virtualization in the Data Center", Cisco, Sep. 15, 2008, online <https://www.cisco.com/c/en/us/products/collateral/storage-network/mds-9000-nx-os-software-release-4-1/white_paper_c11-459263.html >, pp. 1-19.
N-Port Identifier Virtualization (NPIV) and N-Port Virtualization (NPV), Cisco, Document ID: 200127, Sep. 8, 2015, online <https://www.cisco.com/c/en/us/support/docs/storage-networking/mds-9000-series-multilayer-switches/200127-N-Port-Identifier-Virtualization-NPIV.html >, pp. 1-7.
"Understanding NPIV and NPV", Scott's Weblog, Nov. 27, 2009, online <https://blog.scottlowe.org/2009/11/27/understanding-npiv-and-npv/>, pp. 1-6.

* cited by examiner

FIBRE CHANNEL N_PORT VIRTUALIZATION GATEWAY WITH SHORTCUT PATH LOGIC

BACKGROUND

Fibre Channel (FC) is a popular high-speed networking technology, which can run at speeds of two-, four-, eight- and sixteen-gigabits per second. Common situations in which FC is employed include storage area networks (SANs) in enterprise storage systems, for instance. In general, an FC network, or fabric, includes one or more FC switches, host devices like servers, and target devices like storage devices.

An FC switch can have a number of F_Ports that are connected to N_Ports of host devices and target devices. Typically, an N_Port has a single N_Port_ID associated with it, and in turn the N_Port_ID has a single worldwide port name (WWPN) associated with it. A device such as a host or target device registers the WWPN of the N_Port to which it is connected via a fabric login (FLOGI) request, and responsively receives an N_Port_ID.

However, in the case of a device that includes multiple virtual devices, such as a server running multiple virtual machines (VMs), for instance, the fact that the device connects to an FC switch via a single N_Port can be problematic. This is because it may be desired for each VM, for instance, to have its own WWPN and thus its own N_Port_ID for FC zoning and other purposes. More recently, then, N_Port_ID virtualization (NPIV) has been introduced. An FC switch that supports NPIV permits a device connected via a single N_Port to register multiple WWPNs and correspondingly receive multiple $N\_Port_{13}$ IDs. As such, each VM can have its own WWPN and its own N_Port_ID.

A related, but different, technology that has also been more recently introduced is N_Port virtualization (NPV). NPV addresses the tension between there being a limited number of FC domain IDs and the desire to have an increased number of FC switch ports to add more devices to an FC fabric. Specifically, each FC switch has to have its own FC domain ID. To add more devices to an FC fabric, additional FC switches have to be added so that there are available ports to which to connect the devices. However, at some point the number of FC domain IDs can run out, limiting the size of an FC fabric.

NPV ameliorates this issue, by effectively permitting NPV gateways to act as proxies to existing FC switches by in effect adding N_Ports to the switches. NPV requires NPIV at the switch level. An NPV gateway has multiple F_Ports to which to connect host and target devices, and an NP_Port that connects to an F_Port of an FC switch. From the perspective of the FC switch, the NP_Port appears as an NPIV-enabled host. As such, the WWPNs of the N_Ports of the devices connected to the F_Ports of the NPV gateway can be registered so that they receive corresponding $N\_Port_{13}$ IDs. NPIV is therefore used so that the NPV gateway can have multiple $N\_Port_{13}$ IDs.

As such, NPIV may have originally been employed so that virtual N_Ports (i.e., one per VM) could be registered with the FC fabric via their WWPNs to receive associated $N\_Port_{13}$ IDs. Using NPIV in conjunction with NPV permits multiple physical N_Ports connected to F_ports of an NPV gateway to be registered with the FC fabric with their WWPNs to receive associated $N\_Port_{13}$ IDs. The F_Ports of the NPV gateway are effectively, by proxy, F_Ports of the FC switch to which the NP_Port of the gateway is connected. An additional FC domain ID is not needed for the NPV gateway. In this way, additional devices can be added to an FC fabric without having to add FC switches and thus without having to worry about exhausting the limited number of FC domain IDs that are available.

SUMMARY

An example Fibre Channel (FC) N_Port virtualization (NPV) gateway apparatus includes an NP_Port to connect to an F_Port of an FC switch of an FC fabric, the FC switch supporting N_Port_ID virtualization (NPIV), a first F_Port to connect to an N_Port of a host device, and a second F_Port to connect to an N_Port of a target device. The FC NPV gateway apparatus includes FC logic implemented at least in hardware to register the host device and the target device with the FC fabric via the FC switch to permit the host device and the target device to communicate over the FC fabric. The FC NPV gateway apparatus includes shortcut path logic implemented at least in the hardware to create a shortcut path between the host device and the target device to permit the host device and the target device to communicate with one another without communication traversing the FC switch through the NP_Port.

An example non-transitory computer-readable data storage medium stores computer-executable code executable by an FC NPV gateway apparatus having an NP_Port connected to an F_Port of an FC switch of an FC fabric, a first F_Port connected to a host device, and a second F_Port connected to a target device. The code is executable by the FC NPV gateway apparatus to perform a method. The method includes, in response to receiving first communication from the host device through the first F_Port and addressed to the target device, sending the first communication directly to the target device through the second F_Port over a shortcut path through the FC NPV gateway apparatus in lieu of sending the first communication to the FC switch through the NP_Port. The method includes, in response to receiving second communication from the target device through the second F_Port and addressed to the host device, sending the second communication directly to the host device through the first F_Port over the shortcut path through the FC NPV gateway apparatus in lieu of sending the second communication to the FC switch through the NP_Port.

An example method includes receiving from an FC fabric, by an FC NPV gateway apparatus having an NP_Port connected to an F_Port of an FC switch of the FC fabric, a device-online state change notification for a given device directly connected to the FC NPV gateway apparatus. The method includes receiving from the FC fabric, by the FC NPV gateway apparatus, a list of all online devices. The method includes receiving from the FC fabric, by the FC NPV gateway apparatus, active zoneset information. The method includes, for each device of the list that is directly connected to the FC NPV gateway apparatus, creating, by the FC NPV gateway apparatus, a shortcut path between the device and the given device, if the shortcut path does not exist, to permit inter-device communication through the FC NPV gateway directly without traversal over the FC switch.

BRIEF DESCRIPTION OF THE DRAWINGS

The drawings referenced herein form a part of the specification. Features shown in the drawing are meant as illustrative of only some embodiments of the invention, and not

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, N_Port virtualization (NPV) is used in conjunction with N_Port_ID virtualization (NPIV) so that physical N_Ports can effectively be added to a Fibre Channel (FC) switch by using an NPV gateway, which acts as a proxy to the FC switch. An NPV gateway has multiple F_Ports and at least one NP_Port. The F_Ports are each connectable to a host device or a target device, and the NP_Port is connected to a corresponding F_Port of an FC switch.

While the utilization of an NPV gateway permits additional physical N_Ports to be added to an FC fabric so that additional devices can be added to the fabric, without the need for adding more FC switches and thus without exhausting the limited supply of available FC domain IDs, using an NPV gateway nevertheless still has at least one drawback. Specifically, communication between a host device and a target device that are both connected to corresponding F_Ports of an NPV gateway still has to traverse the FC switch to which the gateway is connected. This is generally because an FC zone that is defined to include the host and target devices to permit the two devices to communicate with one another is managed at the FC switch and higher upstream within the FC fabric.

For example, an N_Port of a host device may be connected to a first F_Port of an NPV gateway, an N_Port of a target device may be connected to a second F_Port of the NPV gateway, and an NP_Port of the gateway may be connected to the F_Port of an FC switch. Via NPIV and NPV, each N_Port has its worldwide port name (WWPN) registered with the FC fabric to receive its own corresponding N_Port_ID. Once the N_Ports are registered, the host and target devices, via their associated worldwide names (WWNs), can be configured as a zone to permit them to communicate with one another.

When the host device wishes to communicate with the target device, it sends a communication addressed to the target device to the NPV gateway through the first F_Port. The NPV gateway, as a proxy of the FC switch, sends the communication out its NP_Port, where the communication is received by the switch at its F_Port. The FC switch may perform zone checking, to verify that the target device is in the same zone with the host device such that the latter is permitted to communicate with the former. Upon successful verification, the FC switch sends the communication out its F_Port back to the NPV gateway, which receives the communication at its NP_Port. The gateway then sends the communication to the target device through the second F_Port.

Similarly, when the target device wishes to communicate with the host device, it sends a communication addressed to the host device to the NPV gateway through the second F_Port. The NPV gateway sends the communication out its NP_Port, where it is received by the FC switch at its F_Port. The FC switch may perform zone checking, and when successful, send the communication out its F_Port back to the NPV gateway for receipt at the NP_Port. The gateway then sends the communication to the host device through the first F_Port.

In both these scenarios, then, the FC uplink between the NPV gateway and the FC switch becomes a bottleneck, and can result in low throughput. The FC uplink connecting the NP_Port of the NPV gateway and the F_Port of the FC switch may be shared by a relatively number of devices, equal to the number of physical F_Ports of the gateway. Requiring all FC traffic to traverse the FC switch—even FC traffic between devices connected to the same NPV gateway—can overload the bandwidth of the FC uplink, and at a minimum increases latency of such communication. As such, the utilization of an NPV gateway can result in decreased performance.

Disclosed herein are techniques to overcome this shortcoming of using an NPV gateway. Particularly, shortcut path logic is added to an NPV gateway to create a shortcut path between, for instance, a host device connected to a first F_Port of the gateway and a target device connected to a second F_Port of the gateway. The shortcut path permits these devices to communicate with one another without their communication having to traverse the FC switch through the gateway's NP_Port.

One novel aspect in this respect is adding, by an administrator or other user, the WWN of the NPV gateway itself to the zone that includes the WWNs of the host and target devices. Configuring the zone in this manner permits the NPV gateway to register to receive state change notifications with respect to the zone, including when devices are added to or removed from the zone. As such, the NPV gateway can appropriately create (and remove) shortcut paths between each pair of devices connected to F_Ports of the gateway that are part of the same zone.

Therefore, when the NPV gateway receives a communication from the host device through the first F_Port that is addressed to the target device, the gateway does not send the communication to the FC switch through its NP_Port. Rather, the NPV gateway recognizes that the host and target devices are in the same zone (as is the gateway itself), such that the host device is permitted to communicate with the target device. The NPV gateway thus instead diverts the communication directly through the second F_Port over the shortcut path through the gateway to the target device.

Similarly, when the NPV gateway receives a communication from the target device through the second F_Port that is addressed to the target device, the gateway diverts the communication directly through the first F_Port over the shortcut path to the host device, in lieu of sending it to the FC switch. The shortcut path within the NPV gateway thus permits inter-device communication among devices within the same zone that are connected to F_Ports of the NPV gateway. Latency is reduced because the communication does not have travel up to the FC switch and back down to the NPV gateway. Usage of the bandwidth of the FC uplink between the NPV gateway and the FC switch is correspondingly decreased as well, reducing the potential for bottlenecks occurring at the uplink.

Figure 1:
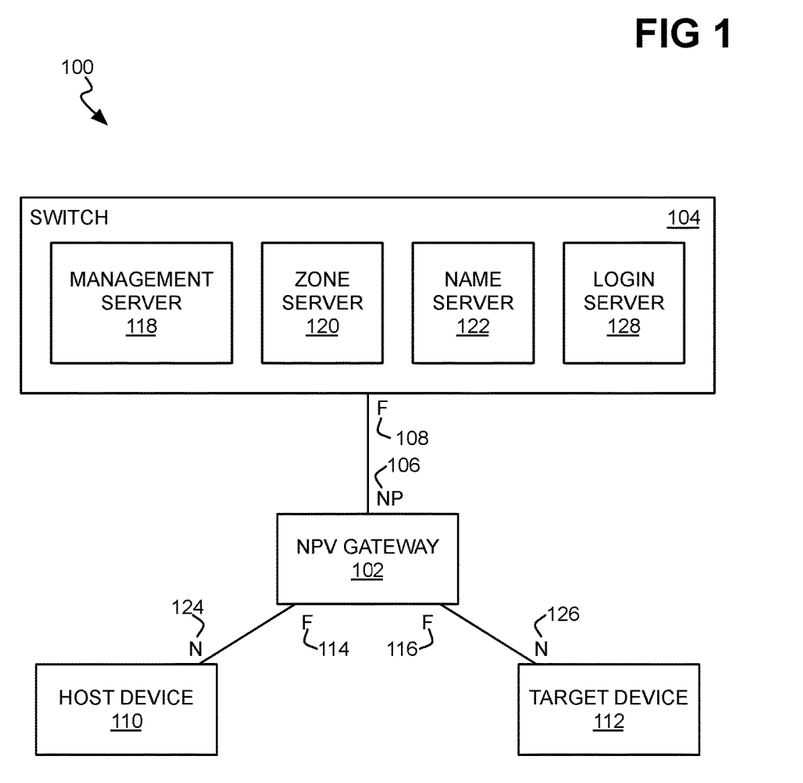
FIG. 1 is a diagram of an example Fibre Channel (FC) fabric in which communication between a host device and a target device that are directly connected to an FC N_Port virtualization (NPV) gateway can occur over a shortcut path within the FC NPV gateway.

FIG. 1 shows an example FC fabric 100. The FC fabric 100 includes an FC NPV gateway 102 that is connected to an FC switch 104 via an NP_Port 106 of the gateway 102 being connected to an F_Port 108 of the switch 104. The FC switch 104 supports NPIV. The FC NPV gateway 102 is connected to an N_Port 124 of a host device 110 and an N_Port 126 of a target device 112 via F_Ports 114 and 116, respectively, of the gateway 102. The host device 110 may, for instance, be a server, whereas the target device 112 may, for instance, be a storage device.

As depicted in the example FC fabric 100, the FC switch 104 includes FC services, including a management server 118, a zone server 120, a name server 122, and a login server 128, which can be implemented as software modules running on the switch 104. In the case where the FC fabric 100 includes multiple FC switches, these services can be centralized, such as within the FC switch 104 as depicted in FIG. 1, or distributed over the various switches. The management server 118 manages the FC fabric 100, by maintaining a database of all the devices within the fabric 100.

The zone server 120 manages device zones within the fabric 100. A zone is configured or defined to include a number of different devices; a given device can be a member of one or more (or none) zones. If a device is included in one or more zones, then communication with that device can only be performed by other devices within the same zone(s). If a device is not part of any zone, by comparison, then no device can communicate with the device. Zones can be defined via worldwide names (WWNs) of the associated devices.

The name server 122 manages the registrations of devices into the fabric 100, such as via worldwide port names (WWPNs) and N_Port$_{13}$ IDs, and so on. The login server 128 manages fabric login (FLOGI) requests from devices to join the FC fabric 100. When a device performs an FLOGI request to join the fabric 100 by reporting the WWPN of the N_Port to which it is connected, the login server 128 returns an N_Port_ID.

At startup, the NPV gateway 102 sends an FLOGI request to the login server 128 (i.e., more generally, to the FC fabric 100) over its NP_Port 106 to receive an FC identifier (FCID). Upon successful FLOGI, the NPV gateway 102 enables its F_Ports 114 and 116, which permits the N_Ports 124 and 126 of the devices 110 and 112 to send FLOGI requests. Upon receiving such an FLOGI request, the NPV gateway 102 converts the FLOGI request into an fabric discovery (FDISC) request, and forwards the FDISC request to the fabric 100 over the NP_Port 106 to receive an additional FCID. On receiving the FDISC response that includes the FCID, the NPV gateway 102 stores the FCID for the device 110 or 112 in question, and responds to the original FLOGI request received from the device.

The NPV gateway 102 thus appears as an NPIV-enabled host device to the FC switch 104, which permits the N_Ports 124 and 126 of the devices 110 and 112 to have their WWPNs registered to receive separate corresponding N_Port$_{13}$ IDs. However, unlike an actual NPIV-enabled host device in which virtual N_Ports are registered, the F_Ports 114 and 116 of the NPV gateway 102 are connected to physical N_Ports. Thus, once the host device 110 has been connected to the F_Port 114 of the NPV gateway 102, the device 110 registers the WWPN of the device N_Port with the fabric 100 (i.e., with the name server 122) to receive a corresponding N_Port_ID. Similarly, once the target device 112 has been connected to the F_Port 116 of the NPV gateway 102, the device 112 registers the WWPN of the device N_Port with the fabric 100 (i.e., with the name server 122) to receive a corresponding N_Port_ID.

The example of FIG. 1 assumes that the host device 110 is to communicate with the target device 112. For example, the host device 110 may be a server that is to perform data processing in relation to data stored on the target device 112. Therefore, the WWNs of the host device 110 and the target device 112 are registered with the fabric (i.e., with the zone server 120) as members of a zone. This permits the devices 110 and 112 to communicate with one another, and provide a level of security in that other devices, since they are not members of the zone, to not communicate with, for example, the target device 112.

The NPV gateway 102 creates a shortcut path within the gateway 102 itself between the host device 110 and the target device 112, so that communication between the devices 110 and 112 does not have to travel out the NP_Port 106 to the F_Port 108 of the switch 104 for zone verification, and back down to the gateway 102 via the F_Port 108 and the NP_Port 106. That is, the gateway 102 creates the shortcut path so that the devices 110 and 112 can directly communicate with one another through the gateway 102 itself, instead of such communication having to traverse the switch 104. As such, when receiving communication from the host device 110 on the F_Port 114, the gateway 102 directly sends the communication over the F_Port 116 to the target device 112. Likewise, when receiving communication from the target device 112 on the F_Port 116, the gateway 102 directly sends the communication over the F_Port 114 to the host device 110.

The NPV gateway 102 is able to create a shortcut path in one implementation once an administer or other user has novelly added the gateway 102 as a member to the zone that includes the host device 110 and the target device 112. More specifically, the WWN of the gateway 102 is registered to be part of the zone including the WWNs (or WWPNs) of the devices 110 and 112. Stated another way, the zone in question is configured to include not only the host device 110 and the target device 112, but the NPV gateway 102 as well. Such registration permits the gateway 102 to receive state change notifications for the zone, and therefore be privy to the membership of the zone (i.e., which devices have been configured to be part of the zone), and changes as to when a device is added to or removed from. A specific implementation in this respect is described later in the detailed description.

It is noted that the FC fabric 100 is depicted in FIG. 1 as including just one host device 110 and just one target device 112. In actuality, there is likely to be many more host devices than just one, and similarly many more target devices than just one. The NPV gateway 102 itself will usually have more than two F_Ports 114 and 116 to which other host and/or target devices can be connected, including host devices that run multiple virtual machines (VMs) that each have its own WWPN and receives its own N_Port_ID via NPIV. Similarly, the FC switch 104 itself can have host and/or target devices connected to its F_Ports.

It is noted that zones can be defined to include both devices connected to the F_Ports of the NPV gateway 102 and devices connected to the F_Ports of the switch 104, but such zones are not described herein. This is because a shortcut cannot by definition be created within the NPV gateway 102 between a device connected to the gateway 102 and a device connected to the switch 104. That is, communication between a device connected to the gateway 102 and a device connected to the switch 104 necessarily traverses the switch 104, and a shortcut created within the gateway 102 itself cannot bypass such traversal.

The host device 110 and the target device 112 can be "pure" FC devices or FC over Ethernet (FCoE) devices. Stated another way, the protocol by which the devices 110 and 112 communicate with the NPV gateway 102 can be the FC protocol. In this respect, the gateway 102 may be considered as an FC aggregator, for instance. The protocol may also be the FCoE protocol. In this respect, the FC protocol is used, but is encapsulated or travels on an Ethernet link (using the Ethernet protocol) between each device 110 and 112 and the gateway 102. The FCoE traffic can coexist with traditional Internet protocol (IP) traffic.

Figure 2:
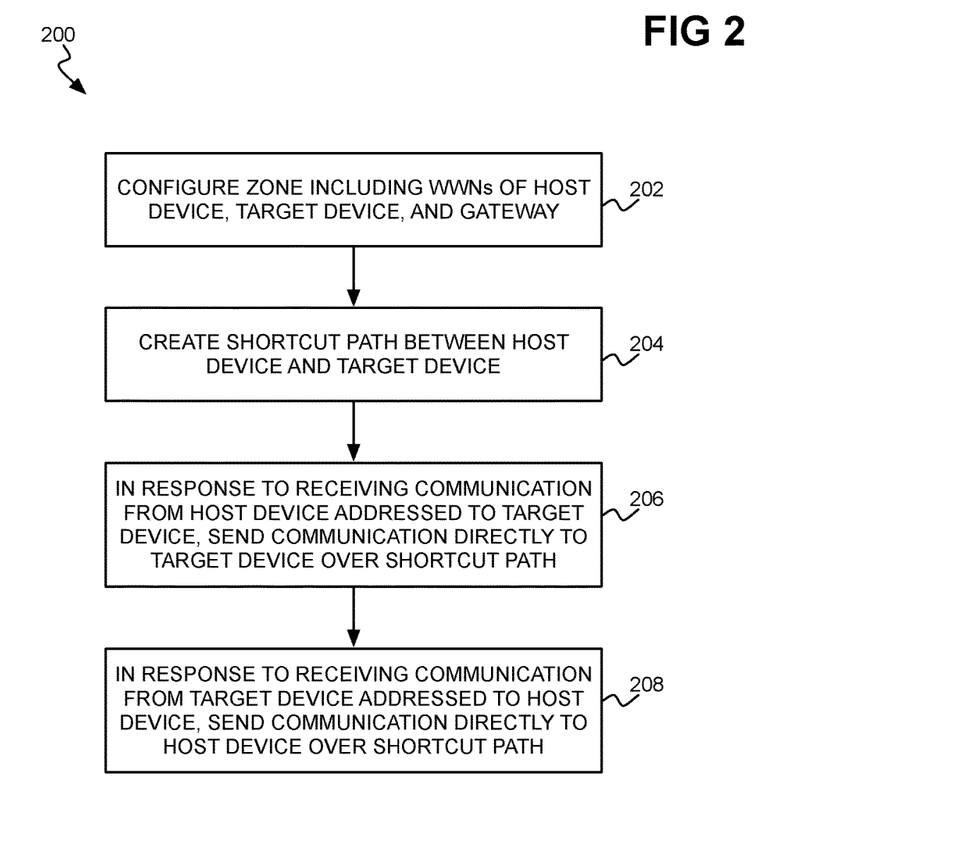
FIG. 2 is a flowchart of an example method for routing communication between a host device and a target device that are directly connected to an FC NPV gateway over a shortcut path within the FC NPV gateway.

FIG. 2 shows an example method 200 that summarizes the creation of a shortcut between the host device 110 and the target device 112 within the NPV gateway 102 and communication between the devices 110 and 112 utilizing this shortcut. The administrator configures a zone with the FC fabric 100 that includes the WWNs of the host device 110, the target device 112, and the gateway 102 (202). In one implementation, the configuration of a zone to include the NPV gateway 102 permits the gateway 102 to then create the shortcut path between the devices 110 and 112, because by being a member of the zone, the gateway 102 is able to learn the identities of the other members of the zone as well as learn of state change notifications to the zone.

As such, the NPV gateway 102 creates a shortcut path between the host device 110 at its F_Port 114 and the target device 112 at its F_Port 116 (204). The shortcut path is a logical path through the gateway 102, as created and controlled by, for instance, shortcut logic of the gateway 102. Via such shortcut logic, the shortcut path is effectuated by recognizing communication from the host device 110 intended for the target device 112 and vice-versa, and intercepting and diverting such traffic to the N_Port of the recipient device so that the traffic does not travel out the NP_Port 106 to the switch 104 as is customary.

Therefore, in response to receiving communication from the host device 110 at the F_Port 114 that is addressed to the target device 112 at the F_Port 116 (such as to the WWN of the device 112), the NPV gateway 102 sends the communication directly to the target device 112 at the F_Port 116 (206). Similarly, in response to receiving communication from the target device 112 at the F_Port 116 that is addressed to the host device 110 at the F_Port 114 (such as to the WWN of the device 110), the NPV gateway 102 sends the communication directly to the host device 110 at the F_Port 114 (208). That is, in both of these cases, it is said that the communications are sent over the logical shortcut path, in lieu of being sent to the switch 104 over the uplink between the NP_Port 106 of the gateway 102 and the F_Port 108 of the switch 104.

FIGS. 3A, 3B, 3C, 3D, and 3E are flowcharts of example methods 300, 320, 350, 360, and 380 respectively, describing an example implementation by which an FC NPV gateway creates shortcut paths between each pair of devices directly connected to the gateway that are part of the same zone, and then sends communications among the devices over the shortcut paths. In the method 300 of FIG. 3A, the NPV gateway sends an FLOGI request over its NP_Port to an FC fabric via an FC switch having an F_Port to which the NP_Port is connected (302). In response, the gateway receives an FCID from the fabric (304), which results in the gateway joining the fabric.

Figure 3A:
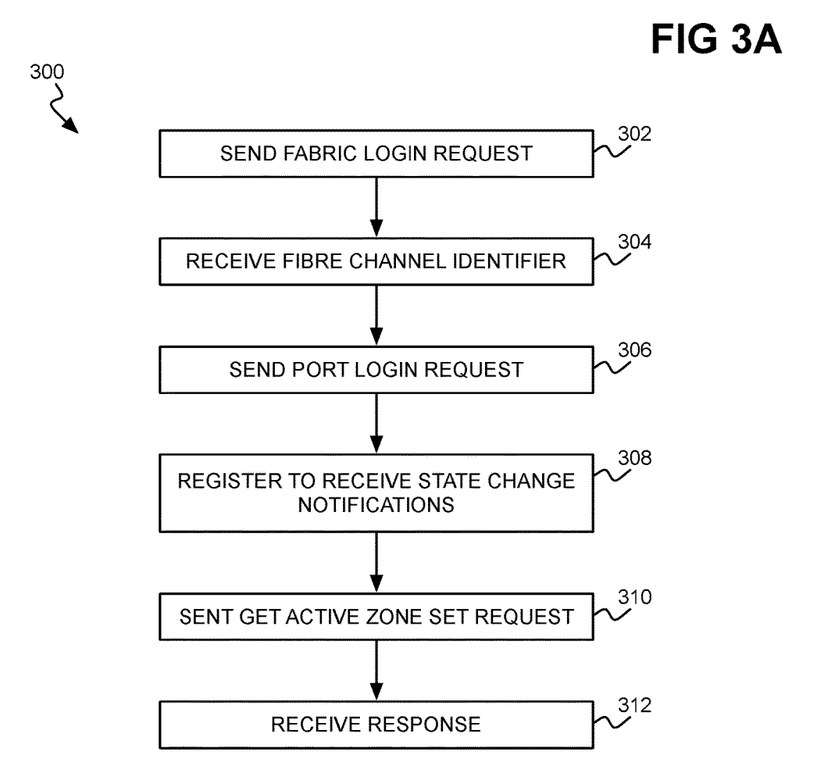
FIGS. 3A, 3B, 3C, 3D, and 3E are example methods for creating and remove shortcut paths within an FC NPV gateway and for send communications over the shortcut paths.

The FC NPV gateway apparatus then sends a port login (PLOGI) request to the name server (NS) and/or the management server (MS) of the FC fabric, over the FC switch (306). The NPV gateway registers to receive state change notifications for the zone that has been configured to include the gateway (308). Such state change notifications include device-online state change notifications as well as device-offline state change notifications. A device-online state change notification is received when a device that is a member of the zone has recently joined the FC fabric. A device-offline state change notification is received when a device that is a member of the zone has recently left the fabric.

The FC NPV gateway further sends a get active zone set (GAZS) common transport (CT) request to the zone server (ZS) of the fabric (310). As a result of sending the PLOGI request in part 306 and responsive to the GAZS CT request in part 310, the NPV gateway receives a response (312) including zoning configuration of all zones (312). An administrator, for instance, may have previously configured the zone in question, via the ZS, to include a number of devices, including the gateway, as well as at least one or more devices connected directly to the gateway at its N_Ports. The zone may have been configured to include other devices of the fabric as well, which are not directly connected to the gateway.

Figure 3B:
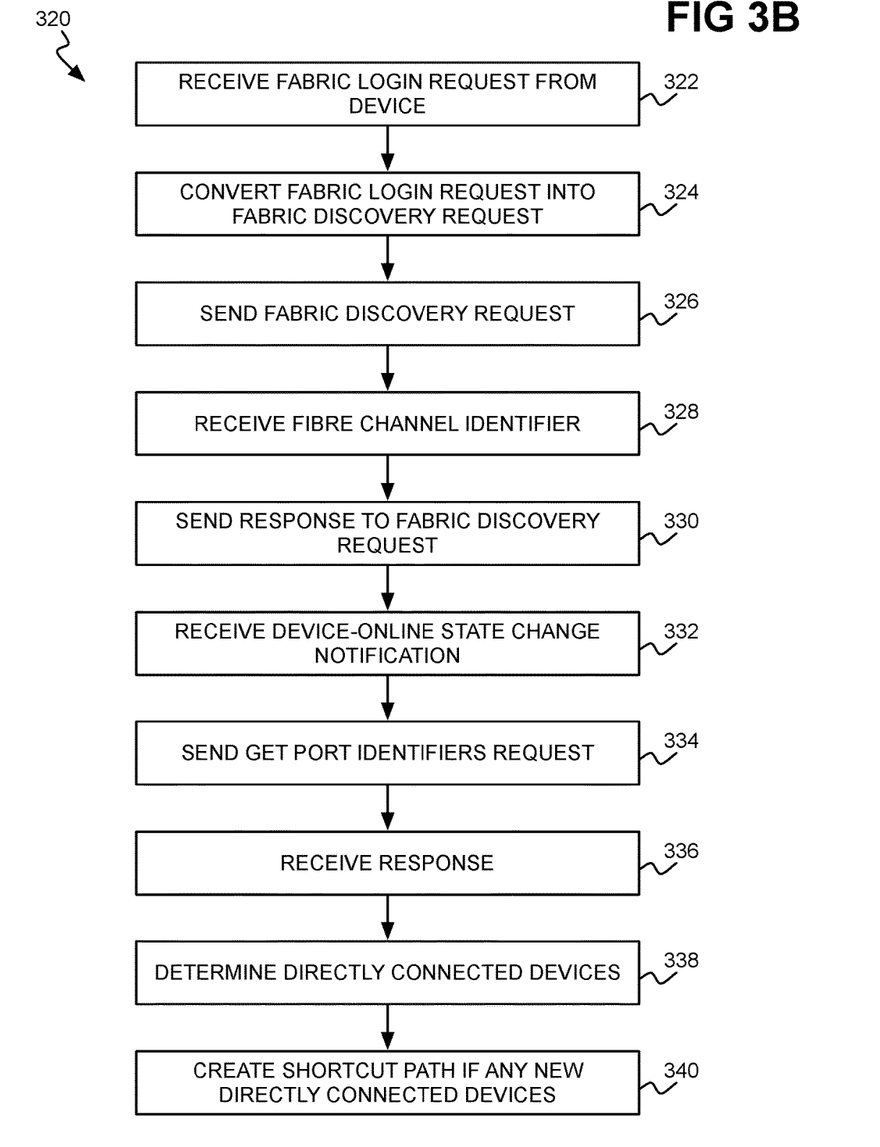

The method 320 of FIG. 3B is performed for each device having an N_Port connected to an F_Port of the FC NPV gateway. The method 320 is described in relation to a single such device. The gateway, receives an FLOGI request from a device connected to it (322), and converts the FLOGI request into an FDISC request (324). The NPV gateway forwards or sends the FDISC request to the FC fabric via the FC switch having the F_Port to which the NP_Port of the gateway is connected (326), and responsively receives an additional FCID, for the device in question (328). The NPV gateway sends a response to the FLOGI request received in part 322 after storing the FCID for the device in question (330).

The FC NPV gateway apparatus then receives a device-online state change notification pertaining to this device (332). The NPV gateway sends a get port identifiers (GID-FT) common transport (CT) request to the NS of the FC fabric over the FC switch (334), and in response receive a list of the devices that are zoned with this device in question from all zones (336). From this list, the gateway determines the directly connected devices within each zone (338). Directly connected devices are those that are directly connected to the FC NPV gateway. The gateway creates a shortcut path between the new device and every other device in the same zone that is also connected directly to the gateway (340), as necessary—that is, if a shortcut path between the two devices in question does not already exist.

Figure 3C:
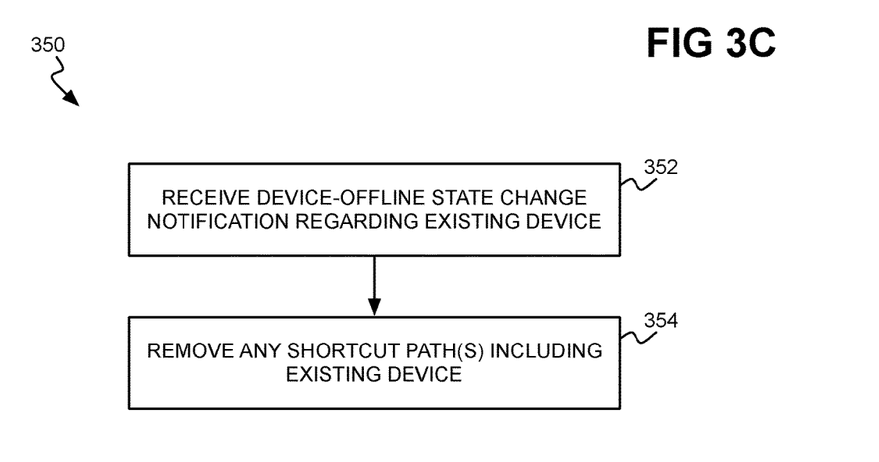

In the method 350 of FIG. 3C, the FC NPV gateway apparatus receives a device-offline state change notification (352). The NPV gateway removes or deletes each shortcut path between the existing device and every other device in the zone that the gateway previously created (354). Thus, the method 320 of FIG. 3B effectively pertains to the situation when a device-online state change notification is received (per part 332 and thereafter), whereas the method 350 pertains to the situation where a device-offline state change notification is received.

Figure 3D:
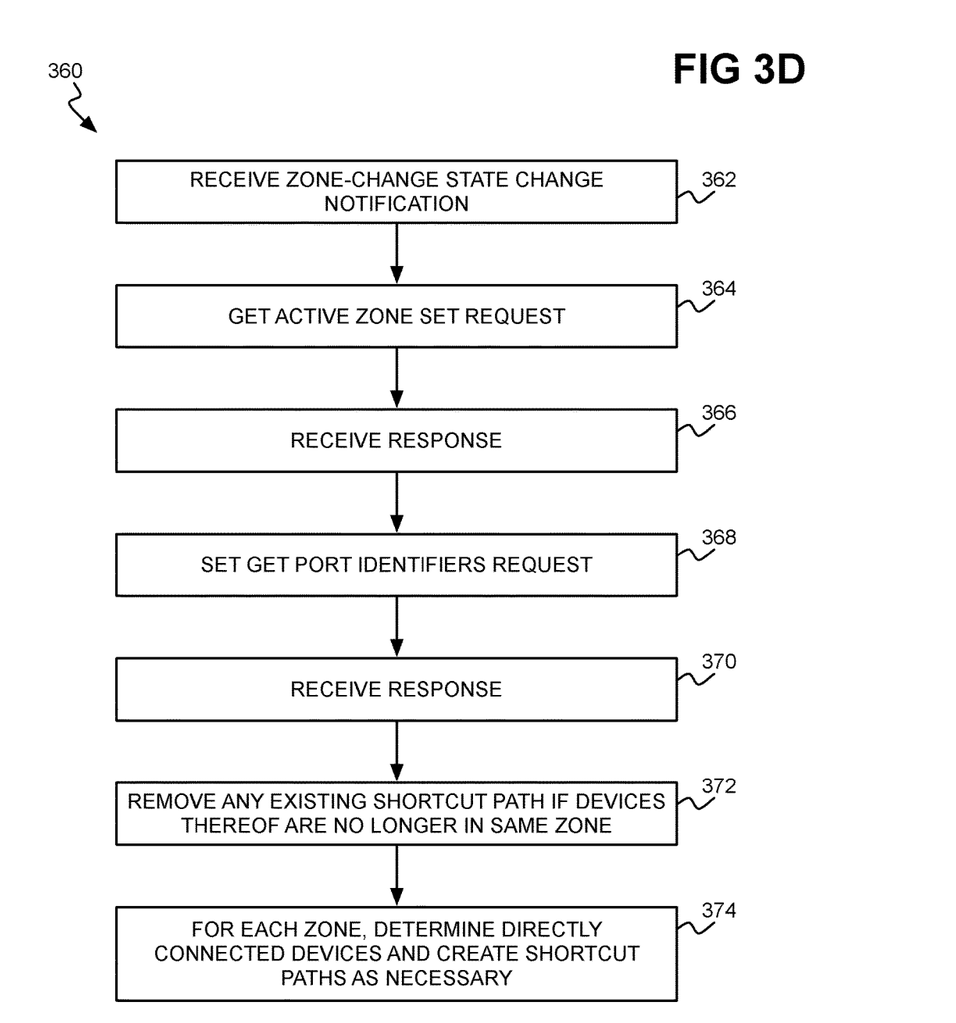

In the method 360 of FIG. 3D, the FC NPV gateway apparatus receives a zone-change state change notification (362), which means that one or more zones of the active zone set request have changed, been added, or have been removed. The NPV gateway therefore sends a GAZS CT request to the ZS of the fabric (364). In response, the gateway receives a response (366) including zoning configuration for each zone of which it is a part.

The FC NPV gateway sends a GID-FT CT request to the NS of the FC fabric over the FC switch (368), and in response receives a list of the devices within each zone (370). The NPV gateway removes any existing shortcut path if the two devices of the shortcut path in question are no longer in the same zone (372). Similarly, for each zone, the gateway determines the directly connected devices within the zone, and creates a shortcut path between each pair of such devices that does not already exist (374). As noted above, directly connected devices are those that are directly connected to the FC NPV gateway.

Figure 3E:
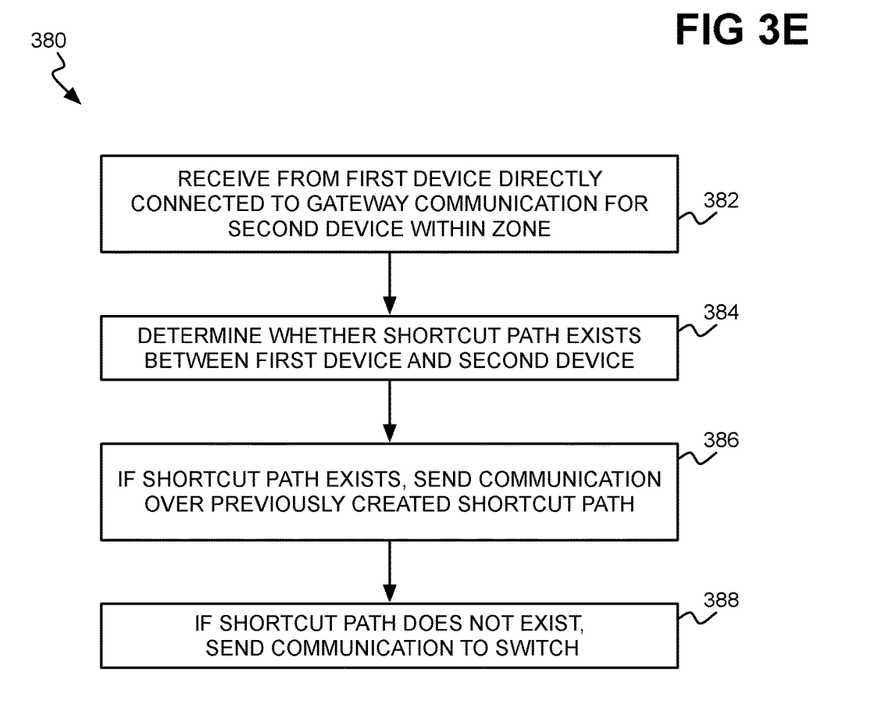

In the method 380 of FIG. 3E, the FC NPV gateway apparatus receives from a first device that is directly connected to the NPV gateway a communication for (i.e., addressed to) a second device within the zone (382). The NPV gateway determines whether a shortcut path exists between the first and second devices (384). If the shortcut path exists, then the gateway sends the communication over a previously created shortcut path within the gateway between the first and second devices (386). For example, the gateway receives the communication from the first device at a first N_Port of the gateway, and sends the communication to the second device at a second N_Port of the gateway, without the communication traversing the FC switch at the NP_Port of the gateway. If the shortcut path does not exist, then the gateway sends the communication to the switch at the NP_Port of the gateway (388). In this case, the switch then routes the communication through the FC fabric to the second device. It is noted that the logic of the method 380 may be implemented within an application-specific integrated circuit (ASIC) of the NPV gateway. The default route is to send communication received by the gateway to the switch. However, if a shortcut path has been created between the device from which the communication was received and the device to which the communication is addressed, then the communication is routed within the gateway itself.

The methods 300, 320, 350, 360, and 380 thus permit the FC NPV gateway to learn which other devices are in the same zone as the NPV gateway, to be kept apprised of membership changes to the zone, and to create and remove shortcuts within the gateway between devices in the zone that are directly connected to the gateway as necessary. The method 300 may be performed once, for the gateway to first join the FC fabric. The methods 320, 350, and 360 are then performed as state change notifications are received, to create new shortcuts or remove existing shortcuts as appropriate. When devices connected directly to the gateway that are part of the zone send communications, the gateway then performs the method 380 to determine whether to route each communication through a shortcut (bypassing the switch) or through the switch, depending on whether the recipient device is connected directly to the gateway.

Figure 4:
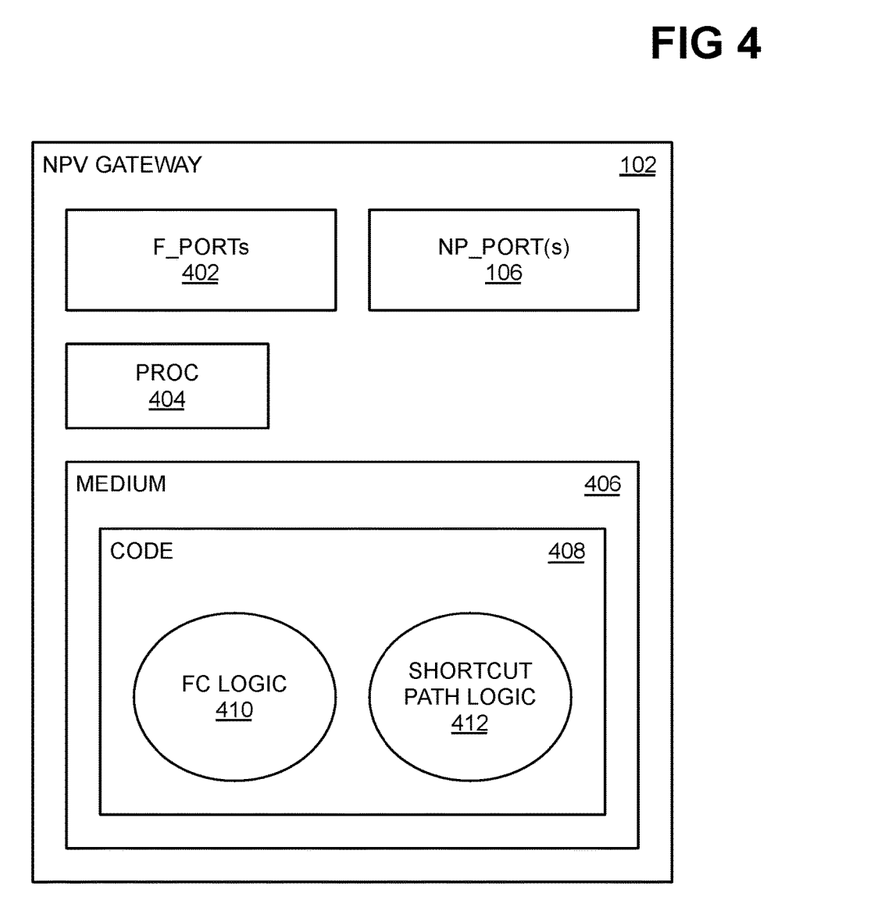
FIG. 4 is a diagram of an example FC NPV gateway that creates shortcut paths between devices directly connected to the NPV gateway and that are in the same FC zone.

FIG. 4 shows an example FC NPV gateway 102 in detail. The NPV gateway 102 includes F_Ports 402, such as the F_Ports 114 and 116 of FIG. 1, and the NP_Port 106 (where there may be more than one NP_Port 106 in some implementations). The gateway 102 in the example implementation of FIG. 4 includes a processor 404 and a non-transitory computer-readable data storage medium 406 that stores computer-executable code 408 that is executed by the processor 404 to implement or realize FC logic 410 and shortcut path logic 412. However, in another implementation, the processor 404 and the medium 406 may be replaced by appropriate specialized hardware programmed to implement or realize the logic 410 and 412, such as a field-programmable gate array (FPGA) or an application-specific integrated circuit (ASIC). In both implementations, the logic 410 and 412 are said to be implemented at least in hardware. For instance, in the former implementation, the hardware in question includes the processor 404 and the medium 406 that stores the code 408.

The FC logic 410 registers devices connected to the F_Ports 402 of the FC NPV gateway 102, such as the host device 110 and the target device 112 of FIG. 1, with the FC fabric 100 via the FC switch 104 to permit these devices to communicate over the fabric 100. The logic 410 may also be responsible for registering the NPV gateway 102 itself with the fabric 100, such as by performing at least some parts of the method 300 of FIG. 3A. By comparison, the shortcut path logic 412, which may also be referred to as an NPV controller to differentiate the functionality performed by this logic 412 from other functionality performed by the NPV gateway 102, creates shortcut paths between devices having N_Ports connected to the F_Ports 402 and that are in the same zone, to permit these devices to communicate with one another without the communication traversing the switch 104 through the NP_Port 106. As such, the logic 412 performs the methods 320, 350, 360, and 380 of FIGS. 3B, 3C, 3D, and 3E, respectively.

The techniques disclosed herein therefore reduce latency and save fabric bandwidth between the FC NPV gateway 102 and the FC switch 104, by permitting devices directly connected to the F_Ports 402 of the NPV gateway 102 that are part of the same zone to communicate without traversing the switch 104. This is achieved by creating shortcut paths between each pair of devices directly connected to the gateway 102 that are part of the same zone. The gateway 102 novelly is added as a member to the zone, which permits the gateway 102 to register for state change notifications as to the zone so that the gateway 102 stays apprised as to membership changes of the zone.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A Fibre Channel (FC) node port (N_Port) virtualization (NPV) gateway apparatus comprising:

a node proxy port (NP_Port) to connect to an F_Port of an FC switch of an FC fabric, the FC switch supporting N_Port_ID virtualization (NPIV);
a first fabric port (F_Port) to connect to a host device;
a second F_Port to connect to a target device;
FC logic communicatively connected to the NP_Port, the first F_Port, and the second F_Port and implemented at least in hardware to register the host device and the target device with the FC fabric via the FC switch to permit the host device and the target device to communicate over the FC fabric; and
shortcut path logic communicatively connected to the first F_Port and the second F_Port and implemented at least in the hardware to create a shortcut path between the host device and the target device to permit the host device and the target device to communicate with one another without communication traversing the FC switch through the NP_Port,
wherein a zone is configured by a user in the FC fabric that includes a worldwide name (WWN) of the host device, a WWN of the target device, and a WWN of the FC NPV gateway apparatus.

2. The FC NPV gateway apparatus of claim 1, wherein the shortcut path logic is to receive communication from the host device through the first F_Port and addressed to the target device, and send the communication directly to the target device through the second F_Port in lieu of the communication being directed to the FC switch through the NP_Port.

3. The FC NPV gateway apparatus of claim 1, wherein the shortcut path logic is to receive communication from the target device through the second F_Port and addressed to the host device, and send the communication directly to the host device through the first F_Port in lieu of the communication being directed to the FC switch through the NP_Port.

4. The FC NPV gateway apparatus of claim 1, wherein the host device and the target device respectively communicate with the FC NPV gateway apparatus through the first F_Port and the second F_Port via FC over Ethernet (FCoE).

5. The FC NPV gateway apparatus of claim 1, wherein the host device and the target device respectively communicate with the FC NPV gateway apparatus through the first F_Port and the second F_Port via FC.

6. A non-transitory computer-readable data storage medium storing computer-executable code executable by a Fibre Channel (FC) node port (N_Port) virtualization (NPV) gateway apparatus supporting NPV and having a node proxy (NP_Port) connected to a fabric port (F_Port) of an FC switch of an FC fabric supporting N_Port_ID virtualization (NPIV), a first F_Port connected to a host device, and a second F_Port connected to a target device, the code executable by the FC NPV gateway apparatus to:
in response to receiving first communication from the host device through the first F_Port and addressed to the target device, send the first communication directly to the target device through the second F_Port over a shortcut path through the FC NPV gateway apparatus in lieu of sending the first communication to the FC switch through the NP_Port; and
in response to receiving second communication from the target device through the second F_Port and addressed to the host device, send the second communication directly to the host device through the first F_Port over the shortcut path through the FC NPV gateway apparatus in lieu of sending the second communication to the FC switch through the NP_port,
wherein a zone is configured by a user in the FC fabric that includes a worldwide name (WWN) of the host device, a WWN of the target device, and a WWN of the FC NPV gateway apparatus.

7. The non-transitory computer-readable data storage medium of claim 6, wherein the first communication and the second communication are FC over Ethernet (FCoE) communications.

8. The non-transitory computer-readable data storage medium of claim 6, wherein the first communication and the second communication are FC communications.

9. A method comprising:
receiving from a Fibre Channel (FC) fabric, by an FC node port (N_Port) virtualization (NPV) gateway apparatus supporting NPV and having a node proxy port (NP_Port) connected to a fabric port (F_Port) of an FC switch of the FC fabric supporting N_Port_ID virtualization (NPIV), a device-online state change notification for a given device directly connected to the FC NPV gateway apparatus;
receiving from the FC fabric, by the FC NPV gateway apparatus, a list of all online devices;
receiving from the FC fabric, by the FC NPV gateway apparatus, active zoneset information of a zone including the given device and the online devices; and
for each device of the list that is directly connected to the FC NPV gateway apparatus:
creating, by the FC NPV gateway apparatus, a shortcut path between the device and the given device, if the shortcut path does not exist, to permit inter-device communication through the FC NPV gateway directly without traversal over the FC switch (340).

10. The method of claim 9, further comprising:
registering with the FC fabric, by the FC NPV gateway apparatus, to receive state change notifications for the zone.

11. The method of claim 9, wherein the given device is a first given device, and the method further comprises:
receiving from the FC fabric, by the FC NPV gateway apparatus, a device-offline state change notification for a second given device; and
removing any shortcut path including the second given device.

12. The method of claim 9, wherein the given device is a first given device, the list of devices is a first list of devices, and the method further comprises:
receiving from the FC fabric, by the FC NPV gateway apparatus, a zone-change state change notification;
receiving, by the FC NPV gateway apparatus, active zoning configuration information;
receiving, by the FC NPV gateway apparatus, a second list of online devices;
removing, by the FC NPV gateway apparatus, any existing shortcut path having a pair of devices that are no longer in the zone; and
creating, by the FC NPV gateway apparatus, a new shortcut path for a pair of directly connected devices if an existing shortcut path for the pair does not exist.

13. The method of claim 9, further comprising:
receiving, by the FC NPV gateway apparatus from a first device connected to a first F_Port of the FC NPV gateway, communication for a second device within the zone including the first device, the second device, and the FC NPV gateway apparatus;
determining, by the FC NPV gateway apparatus, whether the second device is connected to a second F_Port of the FC NPV gateway;

in response to determining that the second device is connected to the second F_Port of the FC NPV gateway, sending the communication directly to the second device over a previously created shortcut path between the first device and the second device, resulting in the communication not traversing the FC switch; and in response to determining that the second device is not connected to the second F_Port of the FC NPV gateway, sending the communication to the FC switch over the NP_Port for routing to the second device through the FC fabric.

* * * * *